(12) United States Patent
Cropper et al.

(10) Patent No.: US 11,023,267 B2
(45) Date of Patent: *Jun. 1, 2021

(54) COMPOSITE VIRTUAL MACHINE TEMPLATE FOR VIRTUALIZED COMPUTING ENVIRONMENT

(71) Applicant: International Business Machines Corporation, Armonk, NY (US)

(72) Inventors: Joseph W. Cropper, Rochester, MN (US); Jeffrey W. Tenner, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 89 days.

This patent is subject to a terminal disclaimer.

(21) Appl. No.: 16/217,690

(22) Filed: Dec. 12, 2018

(65) Prior Publication Data

US 2019/0114198 A1 Apr. 18, 2019

Related U.S. Application Data

(63) Continuation of application No. 15/823,289, filed on Nov. 27, 2017, now Pat. No. 10,162,670, which is a continuation of application No. 15/066,160, filed on Mar. 10, 2016, now Pat. No. 10,162,664, which is a continuation of application No. 14/945,271, filed on Nov. 18, 2015, now Pat. No. 9,898,323.

(51) Int. Cl.
*G06F 9/455* (2018.01)
*G06F 9/445* (2018.01)

(52) U.S. Cl.
CPC ...... *G06F 9/45558* (2013.01); *G06F 9/44505* (2013.01); *G06F 2009/4557* (2013.01); *G06F 2009/45562* (2013.01); *G06F 2009/45595* (2013.01)

(58) Field of Classification Search
CPC ............. G06F 9/45558; G06F 9/44505; G06F 2009/45562; G06F 2009/4557; G06F 2009/45595
See application file for complete search history.

(56) References Cited

U.S. PATENT DOCUMENTS

| | | | |
|---|---|---|---|
| 7,356,679 | B1 | 4/2008 | Le |
| 8,266,616 | B1 | 9/2012 | Jacquot et al. |
| 8,327,350 | B2 | 12/2012 | Chess et al. |
| 8,495,512 | B1 | 7/2013 | Lappas |
| 8,990,804 | B1 | 3/2015 | Lissack et al. |
| 9,329,886 | B2 | 5/2016 | Vincent et al. |
| 2012/0131577 | A1 | 5/2012 | Arcess |

(Continued)

OTHER PUBLICATIONS

List of IBM Patents or Patent Applications Treated as Related.
(Continued)

*Primary Examiner* — Tammy E Lee
(74) *Attorney, Agent, or Firm* — Peter J. Edwards

(57) ABSTRACT

Composite virtual machine templates may be used in the deployment of virtual machines into virtualized computing environments. A composite virtual machine template may define a plurality of deployment attributes for use in a virtual machine deployment, and at least some of these deployment attributes may be determined through references to other virtual machine templates and included in the composite virtual machine template.

14 Claims, 9 Drawing Sheets

(56) References Cited

U.S. PATENT DOCUMENTS

| | | |
|---|---|---|
| 2012/0311579 A1 | 12/2012 | Lee |
| 2014/0019967 A1 | 1/2014 | Gupta |
| 2014/0337844 A1 | 11/2014 | Jin et al. |
| 2015/0074659 A1 | 3/2015 | Madsen et al. |
| 2015/0213106 A1* | 7/2015 | Kunde ............... G06F 9/45558 718/1 |

OTHER PUBLICATIONS

Microsoft System Center; How to Create and Deploy a Virtual Machine from a Template Nov. 1, 2013.
Amazon Web Services; Amazon EC2 Instances Dec. 31, 2014.
Vmware: Deploy a Virtual Machine from a Template in the vSphere Client Jul. 3, 2014.
Vmug (Mike Laverick): Creating and Deploying Templates with vSphere 5.5 Jul. 8, 2014.
Virtuallyghetto (William Lam): Subscribe to vGhetto Nested ESXi Template Content Library in vSphere 6.0 Apr. 8, 2015.
Amazon Web Services; AWS::CloudFormation::Stack Oct. 18, 2014.
Amazon Web Services (Elliot Yamaguchi); Use Nested Stacks to Create Reusable Templates and Support Role Specialization Jan. 13, 2015.
Dreamweaver Help/Creating a nested template Oct. 16, 2014.
IBM; Managing virtual application templates Oct. 4, 2015.
Chef Documents; About Templates Dec. 27, 2014.
Backspace (Miguel Grinberg); OpenStack Orchestration in Depth, Part III: Multi-Instance Deployments Nov. 21, 2014.
U.S. Patent and Trademark Office, Office Action issued in related U.S. Appl. No. 14/945,271 dated Apr. 6, 2017.
U.S. Patent and Trademark Office, Notice of Allowance issued in related U.S. Appl. No. 14/945,271 dated Oct. 11, 2017.
U.S. Patent and Trademark Office, Office Action issued in related U.S. Appl. No. 15/066,160 dated Apr. 10, 2018.
U.S. Patent and Trademark Office, Office Action issued in related U.S. Appl. No. 15/823,289 dated Jun. 8, 2018.
U.S. Patent and Trademark Office, Notice of Allowance issued in related U.S. Appl. No. 15/066,160 dated Aug. 14, 2018.
U.S. Patent and Trademark Office, Notice of Allowance issued in related U.S. Appl. No. 15/823,289 dated Aug. 15, 2018.

* cited by examiner

COMPOSITE VIRTUAL MACHINE TEMPLATE FOR VIRTUALIZED COMPUTING ENVIRONMENT

BACKGROUND

The invention is generally related to computers and computer software, and in particular, to logically-partitioned and virtualized computing environments.

Computing technology has advanced at a remarkable pace, with each subsequent generation of computing system increasing in performance, functionality, and storage capacity, often at reduced cost. In addition, workload allocation of computing and other hardware resources is often employed to maximize the utilization of hardware resources such as processors, memories, networks, storage devices, etc., and thereby reduce the overall costs necessary for supporting a desired workload capacity. Optimizing workload allocation can also have a positive impact on power costs and environmental concerns due to a reduction in the amount of hardware resources required to support a given workload.

Many computer or data processing systems employ virtualization, also referred to as logical partitioning, which enables one or more individual physical computers to each run several operating environments, or operating systems, at once in a virtualized computing environment. In some instances, for example, a single physical computer, which may also be referred to as a host, can run a plurality of operating systems in a corresponding plurality of virtual machines (VMs), also referred to as logical partitions (LPARs). Each operating system resides in its own virtual machine, with each virtual machine allocated a part of a physical processor, an entire physical processor, or multiple physical processors from the computer. Additionally, a portion of the computer's memory may be allocated to each virtual machine. An underlying partition manager, often referred to as a hypervisor or virtual machine monitor (VMM), manages and controls the virtual machines. The hypervisor is typically a part of the system firmware and manages the allocation of resources to the operating systems and virtual machines. As such, one physical computer may run one or more virtual machines and thus virtualize the underlying hardware resources used by the applications, operating systems, and other program code configured to operate in those virtual machines.

Virtualization is increasingly used in data centers and cloud computing applications, which may provide for cost efficiencies through elastic computing, whereby hardware resources from multiple hosts are provisioned and de-provisioned based on workload changes. In such applications, individual workloads may change over time, and as such virtualization may be employed to effectively multiplex hardware resources over multiple workloads to provide an overall greater resource utilization. In order to balance costs, an assumption may be made that not all workloads will run with maximum resource requirements at the same time, so fewer hardware resources than the sum of all maximum resource requirements for workloads may be allocated for a given set of workflows, resulting in the hardware resources being overcommitted. As one example, a cloud provider may allocate more virtual processors (CPUs) across multiple virtual machines on a particular host computer under the assumption that some of the virtual machines will only run at off-peak hours when other virtual machines are shut down or otherwise deactivated.

Some data centers and cloud computing applications may also support the virtualization of other types of hardware resources, such as storage devices and networks, which may enable virtual machines to access virtual networks and/or storage devices, and with the particulars of the underlying hardware supporting such virtual entities managed in a manner that is effectively hidden from the virtual machines. The allocation of such hardware resources to virtual machines may also impact performance and efficiency, as overloading networks and/or storage devices can lead to slow response times, and in some instances, to an inability of a virtual machine to connect to an underlying hardware resource.

Virtualized computing environments may also utilize various technologies that may be used to improve performance and/or reliability. For example, high availability techniques may be employed to handle fault situations, e.g., to automatically restart a virtual machine if the virtual machine is detected to have gone down, to rebuild a virtual machine on a new host if an original host unexpectedly crashes or loses power. In addition, load balancing may be employed to dynamically migrate virtual machines to different hosts, e.g., whenever one host is overloaded and excess capacity is available on another host. Furthermore, energy efficiency is often a concern in many data centers, and as a result, it may be desirable in some instances to consolidate virtual machines on fewer numbers of hosts to enable unused hosts to be powered down.

SUMMARY

According to an embodiment of the present invention, a virtual machine may be deployed in a virtualized computing environment using a composite virtual machine template. In particular, a composite virtual machine template may be accessed from a virtual machine template data store to retrieve a plurality of deployment attributes for use in deploying a virtual machine. The composite virtual machine template includes first and second respective references to first and second virtual machine templates. The first virtual machine template defines a first set of deployment attributes and the second virtual machine template defines a second set of deployment attributes. The plurality of attributes includes the first and second sets of deployment attributes, and retrieving the plurality of deployment attributes includes accessing the first and second virtual machine templates using the first and second references to retrieve the first and second sets of deployment attributes from the virtual machine template data store. In addition, deployment of a virtual machine in the virtualized computing environment may be initiated according to the plurality of deployment attributes.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
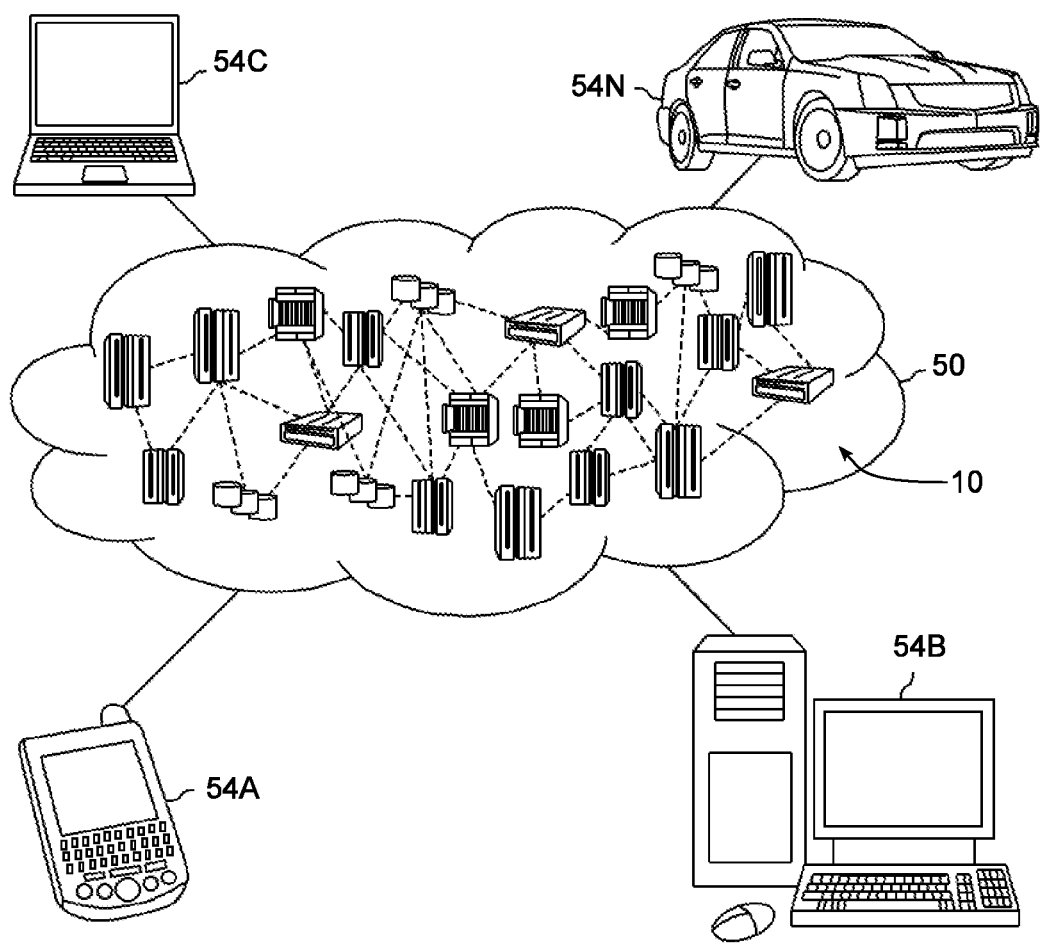
FIG. 1 depicts an example cloud computing environment consistent with the invention.

It is understood in advance that although this disclosure includes a detailed description on cloud computing, implementation of the teachings recited herein are not limited to a cloud computing environment. Rather, embodiments of the invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to the Drawings, wherein like numbers denote like parts throughout the several views, FIG. 1 depicts an illustrative cloud computing environment 50 suitable for use in embodiments consistent with the invention. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
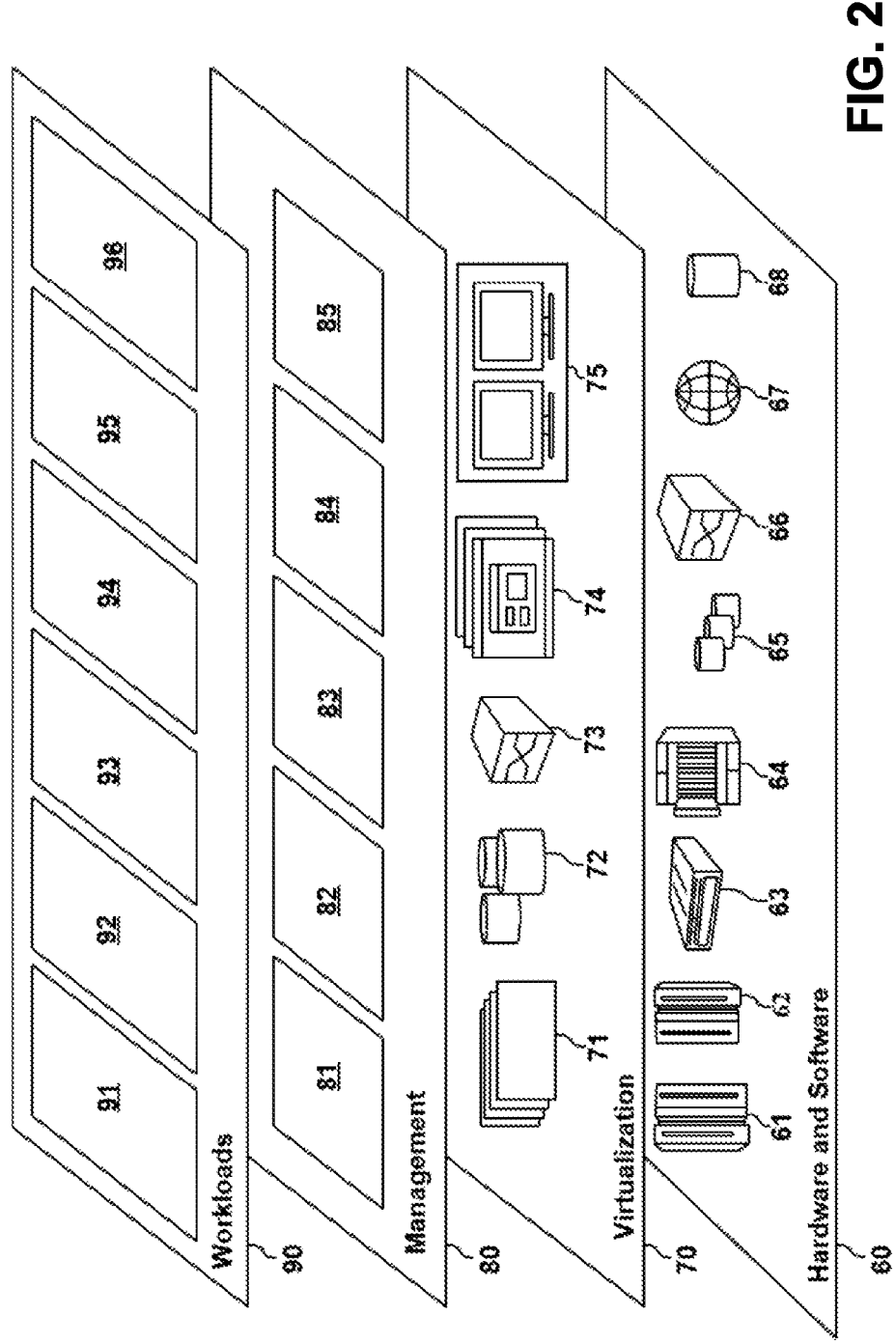
FIG. 2 depicts abstraction model layers according to an example embodiment consistent with the invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Figure 3A:
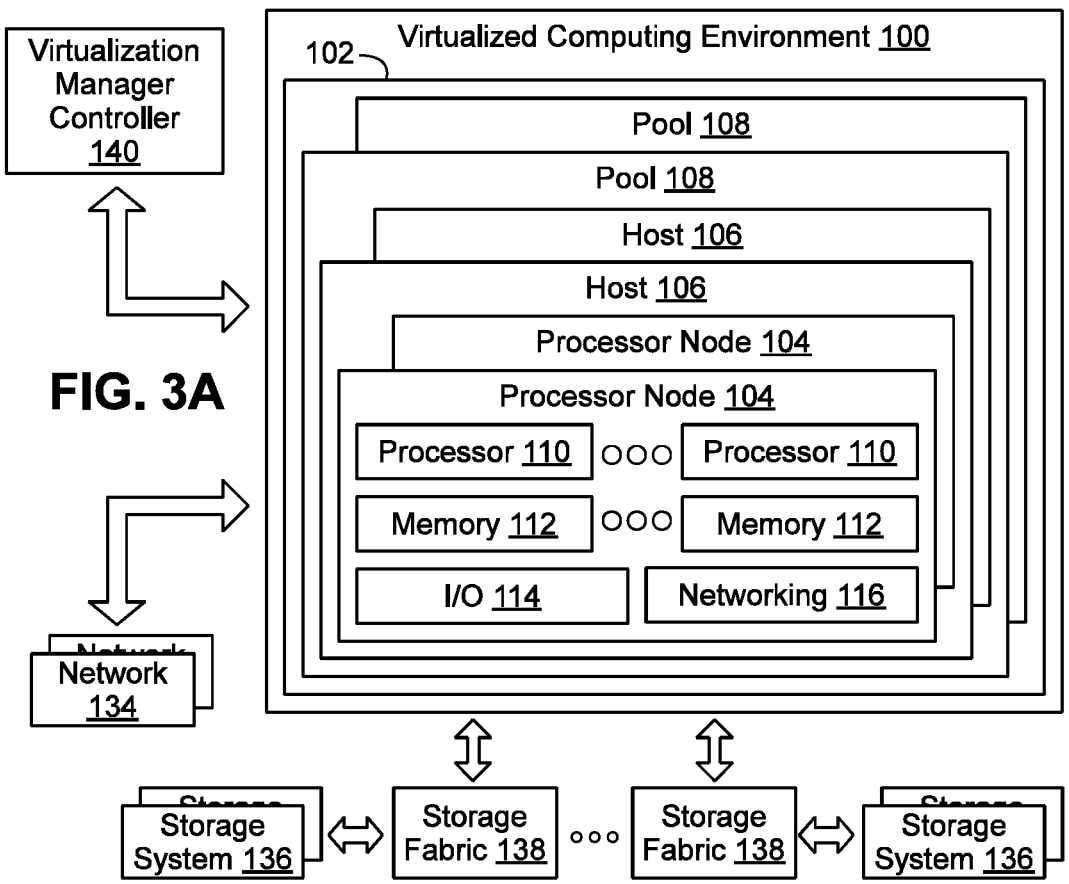
FIGS. 3A and 3B are block diagrams of an example hardware (FIG. 3A) and software (FIG. 3B) environment suitable for implementing a virtualized computing environment consistent with the invention.
Figure 3B:
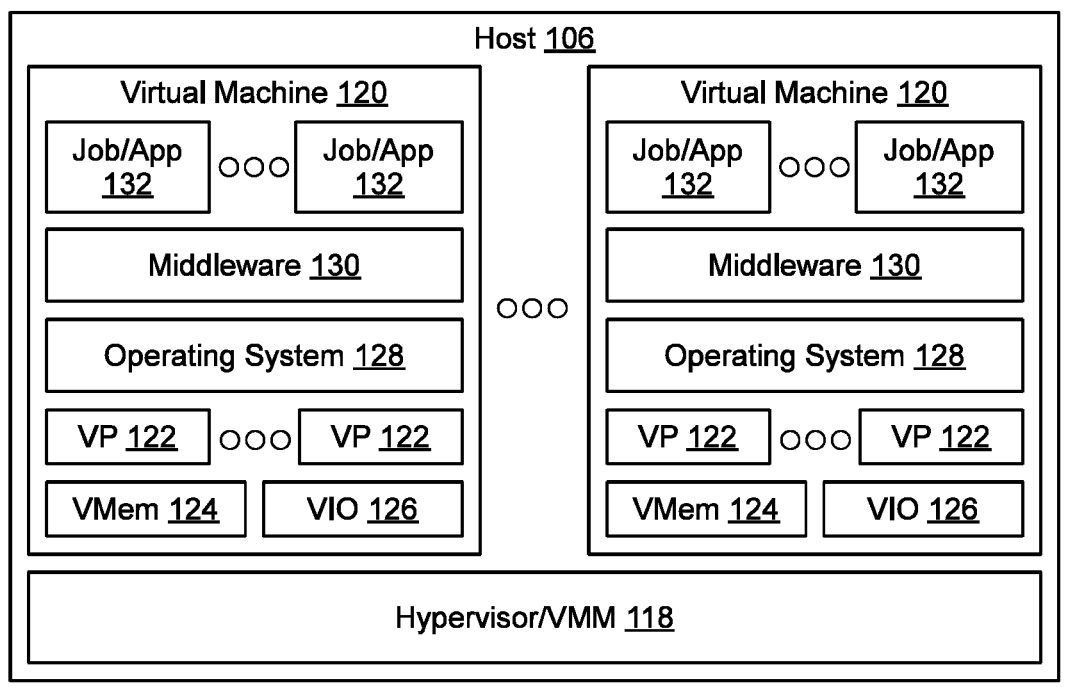

FIGS. 3A-3B illustrate the principal hardware and software components in a virtualized computing environment or apparatus 100 consistent with the invention, and suitable for implementation in a cloud computing environment such as environment 50, as well as in other cloud and/or non-cloud computing environments. As shown in FIG. 3A, apparatus 100 may include a multi-node data processing system 102 where the physical hardware is distributed among a plurality of physical processor nodes 104 disposed in a plurality of hosts or computer systems 106, with the hosts 106 disposed in one or more pools 108. Each processor node 104 includes one or more processors 110, one or more memory devices 112, and in some embodiments, additional hardware such as input/output (I/O) hardware 114 (e.g., one or more input/output (I/O) adapters) and/or networking hardware 116. Appropriate networking functionality (not shown) may also be used to provide data communication between the various processor nodes 104 and hosts 106, as well as other external systems.

Apparatus 100 may be implemented using any of a number of different architectures suitable for implementing a virtualized environment. For example, in one embodiment, apparatus 100 may include one or more of a Power 770, 780 or 795 system available from International Business Machines Corporation, the configuration of which will be apparent to one of ordinary skill in the art having the benefit of the instant disclosure. It will be appreciated, however, that other architectures suitable for executing virtualized environments may be used in other embodiments of the invention, so the invention is not limited to the particular architecture disclosed herein.

Each processor 110 may be implemented as a single or multi-threaded processor and/or as a single or multi-core processor, while each memory 112 may be considered to include one or more levels of memory devices, e.g., a DRAM-based main storage, as well as one or more levels of data, instruction and/or combination caches, with certain caches either serving individual processors or multiple processors as is well known in the art. In addition, the memory of apparatus 100 may be considered to include memory storage physically located elsewhere in apparatus 100, e.g., any cache memory in a processor, as well as any storage capacity used as a virtual memory, e.g., as stored on a mass storage device or on another computer coupled to apparatus 100.

Apparatus 100 operates under the control of one or more kernels, hypervisors, operating systems, etc., and executes or otherwise relies upon various computer software applications, components, programs, objects, modules, data structures, etc., as will be described in greater detail below. Moreover, various applications, components, programs, objects, modules, etc. may also execute on one or more processors in another computer coupled to apparatus 100 via network, e.g., in a distributed or client-server computing environment, whereby the processing required to implement the functions of a computer program may be allocated to multiple computers over a network.

For example, FIG. 3B illustrates various software components 118-132 that may be resident within a host 106 in apparatus 100. A hypervisor or virtual machine monitor (VMM) 118 may host one or more virtual machines (VMs) 120 and may allocate to each virtual machine 120 a portion of the physical hardware resources of host 106 (e.g., processor, memory and/or IO resources associated with one or more processor nodes 104), represented here by one or more virtual processors (VPs) 122, a virtual memory (VMem) 124 and virtual input/output (VIO) resources 126. Each virtual machine 120 may in turn host an operating system 128 and optionally middleware 130, as well as one or more jobs and/or applications 132. It will be appreciated that each virtual machine 120, which may also be referred to as a logical partition, virtual server or virtual computer, may operate in a manner that emulates a separate physical computer, and as such, may host practically any software components capable of being hosted by a computer.

Additional hardware and/or software components may also be resident in apparatus 100, e.g., mass storage hardware, external input/output devices such as printers or displays, and management hardware and/or software, e.g., a hardware management console (HMC) through which the hardware and/or software configuration of the apparatus may be managed by an administrator. Further, in the illustrated embodiments, connectivity to one or more external networks 134 may also be supported, as may connectivity to one or more storage systems 136 through one or more storage fabrics 138. Virtualized environments may be implemented in an innumerable number of manners, and may include an innumerable number of hardware and/or software variations, and as such, the invention is not limited to the particular implementation disclosed herein.

It will be appreciated that the present invention may be a system, a method, and/or a computer program product. The computer program product may include a computer readable storage medium (or media) having computer readable program instructions thereon for causing one or more processors to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the drawings illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition, computer readable program instructions, of which one or more may collectively be referred to herein as "program code," may be identified herein based upon the application within which such instructions are implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the example environment illustrated in FIGS. 1, 2, 3A and 3B is not intended to limit the present invention. Indeed, those skilled in the art will recognize that other alternative hardware and/or software environments may be used without departing from the scope of the invention.

Composite Virtual Machine Template for Virtualized Computing Environment

Deployment of a virtual machine within a virtualized computing environment is generally based on a set of deployment attributes, parameters, settings or properties (hereinafter collectively referred to as "deployment attributes") that define the information needed by a virtualization manager to configure and install a virtual machine onto a host in the virtualized computing environment, and in some instances, to initialize the virtual machine into an active state onto the host. These deployment attributes are generally provided to a virtual machine (VM) deployment user interface (UI) or Application Programming Interface (API) to enable a virtualization manager to properly configure, install and boot a virtual machine, and as such, deployment attributes may be entered manually by a user (e.g., through a UI), provided programmatically by program code (e.g., through an API), or both in connection with a virtual machine deployment in various embodiments. Deployment attributes in some embodiments may include, but are not limited to, attributes such as deployment image attributes specifying, for example, a disk image to deploy with the virtual machine, virtual processor attributes specifying, for example, a number of virtual processors (VCPUs) to assign to a deployed virtual machine, virtual memory attributes specifying, for example, an amount of virtual memory to assign to a deployed virtual machine, virtual network attributes specifying, for example, virtual network configuration information such as static or dynamic IP addressing, redundancy/fail-over options, etc., virtual storage attributes specifying, for example, configuration information such as amount of storage needed, which storage devices to use, what types of storage to use (e.g., flash or commodity hard drives), thin or thick provisioning, etc., high availability attributes specifying, for example, high availability status and/or configuration, etc.

The number of attributes generally needed for a virtual machine deployment can be substantial, so when an administrator wishes to deploy a virtual machine manually, the administrator may be required to enter the attributes manually through a user interface, and generally in a multi-step process that can be both time consuming and a source of potential errors. Some virtualization managers support an ability to bundle sets of deployment attributes into templates to enable an administrator to save and name sets of deployment attributes for retrieval and reuse in later virtual machine deployments, thereby avoiding the need to re-enter the same sets of deployment attributes. It has been found, however, that conventional templates may not always cover all attributes needed for a virtual machine deployment, and in some instances multiple templates may need to be specified for a given deployment. Furthermore, for many virtual machine deployments, many of the deployment attributes will be the same except for a few deployment attributes (e.g., virtual machine deployments to test and production environments may differ by only a few attributes), and creating templates for all of the different variations may result in a propagation of templates that becomes labor intensive to manage, and can introduce errors or sub-optimal virtual machine operation due to the selection of the wrong template by an administrator.

Embodiments consistent with the invention, on the other hand, may utilize composite virtual machine templates to provide greater flexibility in the specification of virtual machine deployment attributes. As will be appreciated from the discussion hereinafter, composite virtual machine templates may be used in some embodiments to substantially reduce the need for complex user input during a virtual machine deployment process, as well as to substantially reduce the complexity and overhead of managing templates used in a virtualized computing environment. As a result, deployment of virtual machines in some embodiments may be performed with reduced overhead, reduced errors, and in some instances, with less expertise required on the part of an administrator or other user of the virtualized computing environment.

In this regard, a virtual machine template may be considered to be a type of template having an identifier and from which a set of one or more deployment attributes associated with a virtual machine deployment may be retrieved to enable a deployment of a virtual machine to be performed using the attribute(s) specified by the virtual machine template. A composite virtual machine template may be considered to be type of virtual machine template that is capable of referencing one or more other virtual machine templates, such that any deployment attributes specified by any virtual machine template referenced by a composite virtual machine template are effectively incorporated into the set of deployment attributes for the composite virtual machine template.

In some embodiments, composite virtual machine templates may also include a set of one or more deployment attributes in addition to references to one or more virtual machine templates. Further, in some embodiments, all virtual machine templates defined in a virtualized computing environment may be configured as composite virtual machine templates, with some composite virtual machine templates lacking references to any other composite virtual machine templates. In other embodiments, however, composite virtual machine templates may be considered to be separate types of templates from other virtual machine templates. In addition, in some embodiments, composite virtual machine templates referenced by other composite virtual machine templates may themselves reference other virtual machine templates such that a set of deployment attributes for a particular composite virtual machine template may incorporate deployment attributes specified by multiple levels of virtual machine templates.

In order to reference another virtual machine template, a composite virtual machine template in some embodiments may include a reference, e.g., a pointer, a name, or other identifier that uniquely identifies the referenced virtual machine template. In some embodiments, for example, a reference may be a textual name assigned to a referenced virtual machine template such that virtual machine templates may be selected and managed in an intuitive manner, while in other embodiments, references may be separate from any textual name assigned to a virtual machine template.

Further, in some embodiments, a composite virtual machine template may reference multiple types of virtual machine templates stored in one or more template data stores. For example, in one embodiment, sets of compute-related, network-related and storage-related virtual machine templates may be defined, such that different composite virtual machine templates may be created based upon different combinations of compute-related, network-related and/or storage-related virtual machine templates. As such, in some embodiments, sets of finer grain virtual machine templates may be created to address different aspects of a virtual machine deployment, e.g., with different sets of compute, storage and network-related deployment attributes, enabling virtual machine deployments to be defined simply through combining these different types of finer grain virtual machine templates. As one example, an administrator may be permitted to create various virtual machine templates for each of compute (e.g., small/medium/large/etc.), storage (e.g., commodity/enterprise-single-fabric/enterprise-dual-fabric/etc.) and network (e.g., gigabit-dhcp/gigabit-static/10 gigabit-static/etc.) elements, and then combine those different types of virtual machine templates together into different combinations in different composite virtual machine templates that may cover most if not all usage situations for a particular virtualized computing environment. Further, it will be appreciated that in some embodiments, virtual machine templates, including composite virtual machine templates, may be predefined and installed within a virtualized computing environment by a manufacturer, developer, or other vendor, and/or may be shared between different virtualized computing environments.

In addition, it will be appreciated that in some embodiments modifications made to virtual machine templates referenced by a composite virtual machine template may be effectively automatically propagated to the composite virtual machine template the next time the composite virtual machine template is used to deploy a virtual machine. Accordingly, where it is found that it is of benefit to make a particular change to a deployment attribute in a virtual machine template referenced by multiple composite virtual machine templates, that change will be effectively propagated to all of those composite virtual machine templates. Thus, in contrast to an environment where templates are required to individually incorporate all necessary deployment attributes, the use of composite virtual machine templates may save management overhead that would otherwise be required to update multiple templates and/or may reduce the likelihood that one or more of such templates is never updated.

As such, in some embodiments, end users such as administrators may be able to quickly and efficiently create composite virtual machine templates from various combinations of previously-created virtual machine templates and thereby have highly customizable, simple-to-deploy entities that may minimize the amount of information that needs to be duplicated across multiple virtual machine templates. Furthermore, in some instances finer grain templates may be normalized and/or optimized for a particular virtualized computing environment to reduce the level of skill needed by an end user in order to effectively manage such an environment. As one example, a user may be able to select from "small," "medium" or "large" compute-type virtual machine templates without necessarily having to know or understand what deployment attributes (e.g., number of virtual processors and/or amount of virtual memory) are associated with those different compute-type virtual machine templates.

In fact, in some embodiments, rather than an administrator having to manually key in all of the relevant attributes needed to deploy a virtual machine, the administrator may be able to create a single higher level composite virtual machine from multiple lower level virtual machine templates, give it a name, and press a deploy user interface control, with software such as a virtualization manager then handing the task of performing the actual virtual machine deployment using the deployment attributes specified by the referenced lower level virtual machine templates. Subsequent deployments using the same composite virtual machine template in such embodiments may also be simplified further, as an administrator may simply select the composite virtual machine template and press the deploy user interface control.

Figure 4:
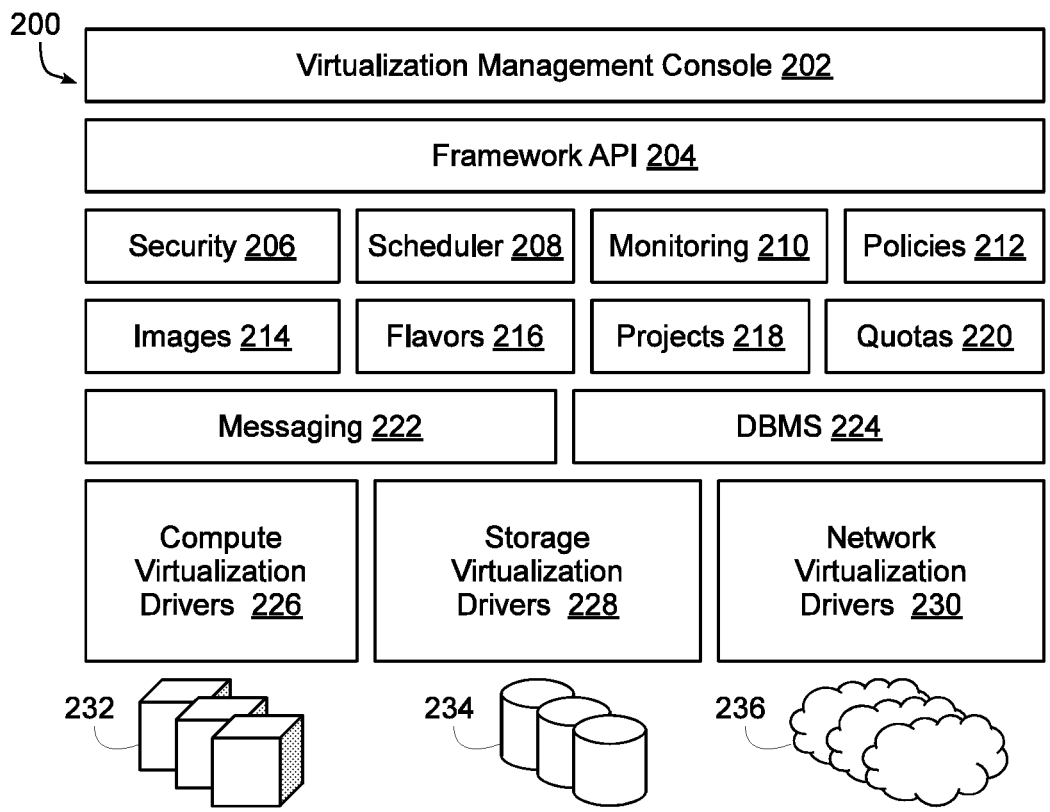
FIG. 4 is a block diagram of example software components in a cloud computing framework for use in performing virtualization management in the virtualized computing environment of FIGS. 3A-3B.

Now turning to FIG. 4, an example virtualized computing environment suitable for implementing composite virtual machine templates is illustrated by a cloud computing framework 200. Framework 200 may be based in some embodiments on the OpenStack architecture, and may include a virtualization management console 202 that interfaces with the framework through a framework API 204. Framework 200 may be considered to implement at least a portion of a computer-implemented virtualization or cloud manager, and may include a management service layer that includes a security service 206, a scheduler service 208, and monitoring service 210, which respectively provide security, virtual machine scheduling/placement and event monitoring functionality. Additional management functionality may manage various persisted entities in the framework, including policies 212, images 214, flavors 216, projects 218 and quotas 220. Policies 212 may include policies related to virtualization management. Images 214 refer to disk or server images for virtual machines, including images used for templates, as well as images used for backups. Flavors 216 refers to a template data store that persists templates that define various configuration settings for virtual machines, e.g., sizes for virtual memory, disk, virtual CPUs, etc., and in the illustrated embodiment, flavors 216 may include composite virtual machine templates as described herein. Projects 218 refer to tenants, or groups of users, and quotas 220 refer to operational limits established for different projects.

A middleware layer may include a messaging service 222, e.g., an AMQP (Advanced Message Queuing Protocol)

message broker, and a database service (DBMS) 224. In addition, virtualization drivers, e.g., compute virtualization drivers 226, storage virtualization drivers 228, and network virtualization drivers 230 respectively interface with physical compute resources 232, physical storage resources 234 and physical network resources 236.

Elements of framework 200 may be implemented, for example, in a virtualization manager controller 140 (FIG. 3A), with other elements implemented within one or more hosts, e.g., within one or more virtual machines resident on one or more hosts. In other embodiments, however, various elements of framework 200 may be implemented in other hardware, whether external or internal to a virtualized computing environment.

Framework 200 may be configured to receive requests from users such as administrators or customers for various types of virtual machine management operations, and in response thereto, to initiate performance of those operations within a virtualized or cloud computing environment. Among these requests may include requests to create, modify, delete, and otherwise manage virtual machine templates, as well as requests to deploy virtual machines using such virtual machine templates. In particular, framework 200 may support functionality that deploys a virtual machine by accessing a composite virtual machine template from a virtual machine template data store to retrieve a plurality of deployment attributes for use in deploying the virtual machine. The accessed composite virtual machine template may include first and second respective references to first and second virtual machine templates, with the first virtual machine template defining a first set of deployment attributes and the second virtual machine template defining a second set of deployment attributes, and with the plurality of attributes including the first and second sets of deployment attributes. The retrieval of the plurality of deployment attributes may include accessing the first and second virtual machine templates using the first and second references to retrieve the first and second sets of deployment attributes from the virtual machine template data store. The framework may also support functionality that initiates a deployment of a virtual machine according to the plurality of deployment attributes.

In some embodiments, virtual machine templates may be defined as named X-tuples (where X refers to the number of customizable attributes used for a virtual machine deployment), which may essentially create a unique deployable entity such as a workload pattern. Composite virtual machine templates may be considered to be comprised of other virtual machine templates, and by using an X-tuple construct, an administrator may create a composite virtual machine template that consists of 1 . . . * templates and/or 1 . . . * attributes.

Figure 5:
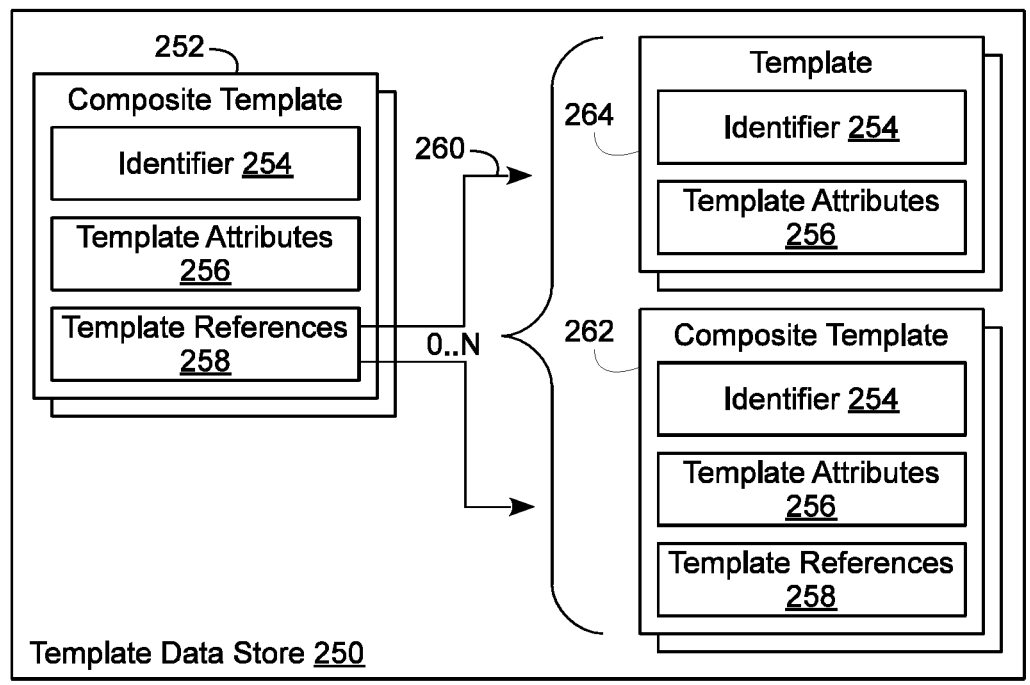
FIG. 5 is a block diagram of an example implementation of a template data store in the virtualized computing environment of FIGS. 3A-3B.

FIG. 5, for example, illustrates an example template data store 250 that persists or stores a plurality of composite virtual machine templates 252. Each composite virtual machine template 252 may include a plurality of data elements, including, for example, a template identifier element 254, a template attribute element 256, and a template reference element 258. Template identifier element 254 may store a unique identifier for the composite virtual machine template, and may be implemented, for example, as a pointer, an address, a number, a character string, etc. Template attribute element 256 may store a set of deployment attributes to be associated with the composite virtual machine template. Practically any data structure suitable for storing attributes may be used, including, for example, a set or list of key-value pairs, a row of an attribute table, an ordered list of attribute values, etc. Template reference element 258 may store a set of references (illustrated at 260) to other virtual machine templates, including both composite virtual machine templates 262 (which, similar to composite virtual machine template 252, each include a template identifier element 254, a template attribute element 256, and a template reference element 258), and non-composite virtual machine templates 264 (each of which includes a template identifier element 254 and a template attribute element 256, but lacks a template reference element 258).

It will be appreciated that in some embodiments, both non-composite and composite virtual machine templates may include each of a template identifier element 254, a template attribute element 256, and a template reference element 258, but with non-composite virtual machine templates having no references stored in their respective template reference element 258. Moreover, in some embodiments, some virtual machine templates may not specify any associated deployment attributes, such that the template attribute element 256 therefor is null or stores an empty set. In still other embodiments, deployment attributes may only be stored in non-composite virtual machine templates, such that each composite virtual machine template lacks a template attribute element 256, or such that the template attribute element 256 for each composite virtual machine template is null or stores an empty set. Other variations will be apparent to those of ordinary skill having the benefit of the instant disclosure.

Each reference 260 may be implemented using any of a number of different manners suitable for referencing another data structure, e.g., using a unique identifier, a pointer, a row number, an index value, etc. In the illustrated embodiment, for example, each reference 260 may include the identifier stored in the respective template identifier element 254 for the referenced virtual machine template 262, 264.

Figure 6:
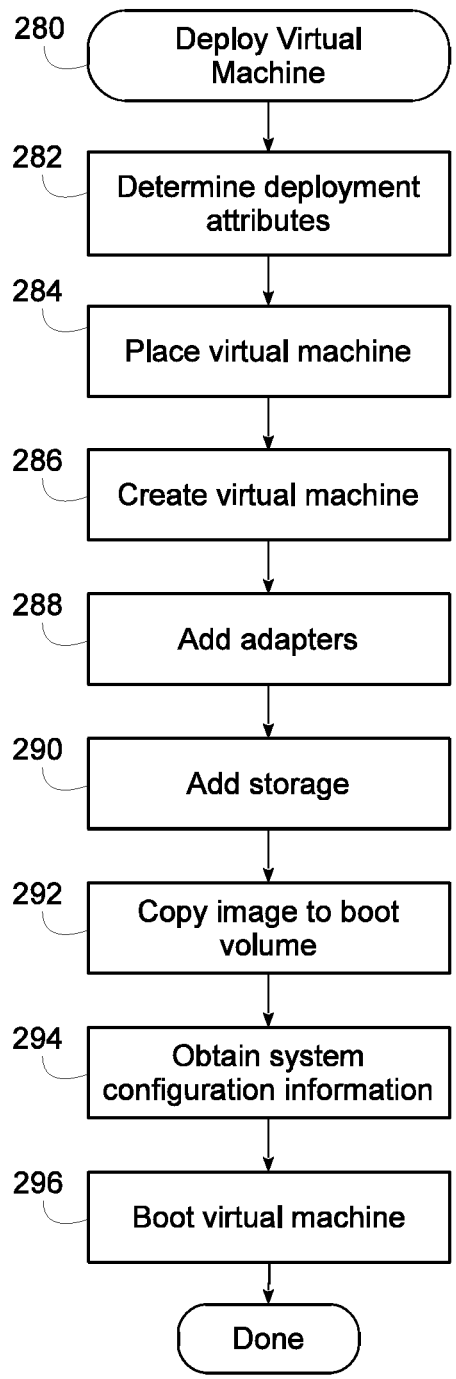
FIG. 6 is a flowchart illustrating an example sequence of operations for deploying a virtual machine in the virtualized computing environment of FIGS. 3A-3B.

FIG. 6 next illustrates an example sequence of operations 280 for deploying a virtual machine in a virtualized computing environment such as illustrated in FIGS. 3A-3B. Sequence of operations 280 may be implemented, for example, within framework 200 of FIG. 4, and utilizing template data store 250 of FIG. 5. The sequence of operations may be initiated, for example, in response to a request for a virtual machine management operation such as a virtual machine deployment operation, and it is assumed for the purposes of this discussion that a composite virtual machine template has been specified to provide at least a portion of the deployment attributes used in the deployment operation. It will be appreciated that the composite virtual machine template may be specified in the request in some embodiments, although in some embodiments, the template to be associated with a deployment operation may be identified in other manners (e.g., based on a default template).

First, in block 282, the deployment attributes to be used in the deployment are determined. In some embodiments, all of the deployment attributes needed to deploy a virtual machine in response to the request are accessible using the specified composite virtual machine template, while in other embodiments additional deployment attributes, including additional configuration or settings information, may also be used in the deployment. The determination of deployment attributes using a composite virtual machine template is discussed below in connection with FIG. 7.

Next, in block 284, the virtual machine to be deployed is placed on a host, i.e., a host for the virtual machine is selected from a plurality of hosts in the virtualized computing environment, and generally using a host placement algorithm. A host may selected based upon various factors, including compatibility with the deployment attributes specified by an administrator as well as optimizing the overall performance of the virtualized environment by balancing workloads.

Next, once a host is selected for the virtual machine, the virtual machine is created in block 286, e.g., by instructing virtual machine management functionality on the selected host to create a new virtual machine on that host. Next, in block 288, one or more virtual adapters may be added to the virtual machine, e.g., to create network and/or storage connectivity, and in block 290, one or more virtual storage volumes may be added for the virtual machine. Then, in block 292, a virtual machine image is copied to the boot volume, e.g., from a collection of pre-stored images including the operating system and application(s) to execute in the virtual machine.

Block 294 next obtains system configuration information for the operating system of the virtual machine, e.g., information such as host name, IP address, etc. In some embodiments, for example, a virtual optical drive may be added to the virtual machine with the system configuration information provided on a virtual optical disc. In other embodiments, the system configuration information may be obtained in another manner, e.g., via a networked metadata service. Then, in block 296, the virtual machine is booted. Booting a virtual machine is analogous to powering on a physical computer and bringing it into a fully active state, and thus may be considered to incorporate the initialization and execution of program code of the virtual machine to bring the virtual machine into a fully active state. Upon completion of block 296, the virtual machine deployment operation is complete.

It will be appreciated that the deployment of virtual machines may be implemented in a number of different manners in different virtualized environments. As such, a number of different alternative processes may be used in other embodiments, as will be appreciated by one of ordinary skill in the art having the benefit of the instant disclosure.

Figure 7:
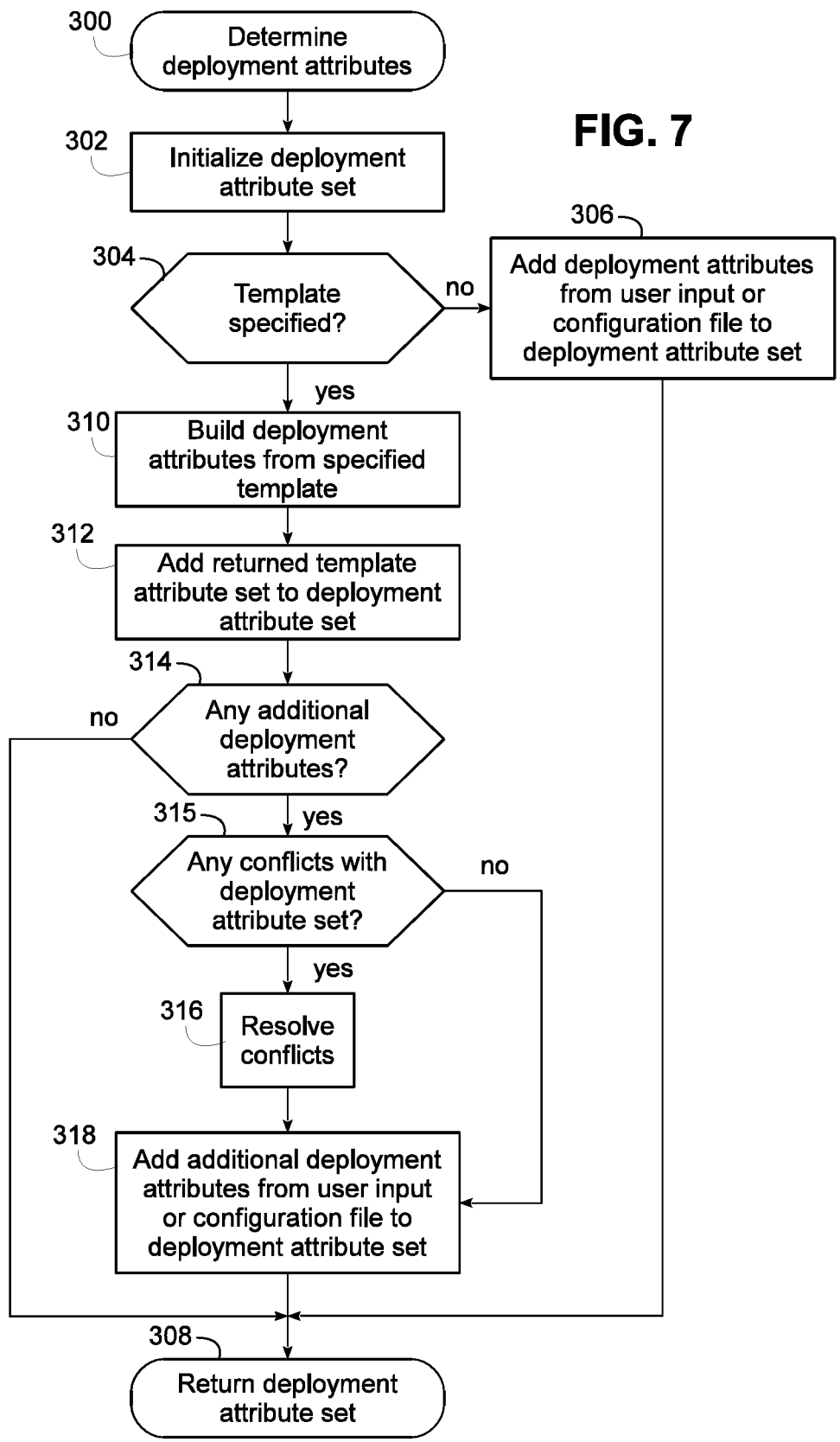
FIG. 7 is a flowchart illustrating an example sequence of operations for determining deployment attributes in the virtualized computing environment of FIGS. 3A-3B.

FIG. 7 next illustrates an example sequence of operations 300 for determining deployment attributes using a composite virtual machine template, e.g., as may be performed in block 282 of FIG. 6. It is assumed for the purposes of this embodiment that attributes are specified as key-value pairs, with the key of each key-value pair identifying the type of attribute, and the value specifying a value for that type of attribute. For other data structures or representations of template attributes, other functionality may be used to determine the deployment attributes to be used in a deployment operation.

First, in block 302, a deployment attribute set, representing the set of deployment attributes to be used in the virtual machine deployment, is initialized, e.g., to a null set. Then, in block 304, a determination is made as to whether a template has been specified for the deployment operation. If not, individual deployment attributes, e.g., as may be entered by an administrator through a user interface and/or specified in a configuration file provided with a request, may be added to the deployment attributes set in block 306, and the deployment attribute set may be returned in block 308.

If, on the other hand, a virtual machine template is specified, block 304 passes control to block 310 to build deployment attributes from the specified template, a process that is described in greater detail below in connection with FIG. 8. Block 312 then adds the template attributes returned by this process to the deployment attribute set. Block 314 then determines if any additional deployment attributes are specified separate from the specified virtual machine template, e.g., via user input, a configuration file, or via other sources, and if not, control passes to block 308 to return the deployment attribute set.

If so, however, block 314 passes control to block 315 to determine whether any of the additional deployment attributes raise any conflicts with any deployment attributes in the deployment attribute set. A conflict may arise, for example, if any additional deployment attribute specifies a different value for a deployment attribute that is already included in the deployment attribute set. If so, control passes to block 316 to resolve any conflicts. Conflicts may be resolved in any number of manners, e.g., by prioritizing deployment attributes specified in virtual machine templates over deployment attributes specified separate from virtual machine templates, or vice versa. For example, in some embodiments, it may be desirable to overwrite or override a deployment attribute value defined in a virtual machine template if a different value is specified outside of the template.

Once any conflicts are resolved in block 316, or if no conflicts are detected in block 315, block 318 adds the additional deployment attributes to the deployment attribute set, and control then passes to block 308 to return the deployment attribute set. It will be appreciated that while sequence of operations 300 supports the specification of only a single virtual machine template for a virtual machine deployment operation, multiple virtual machine templates may be specified and processed for a given virtual machine deployment operation in other embodiments.

Figure 8:
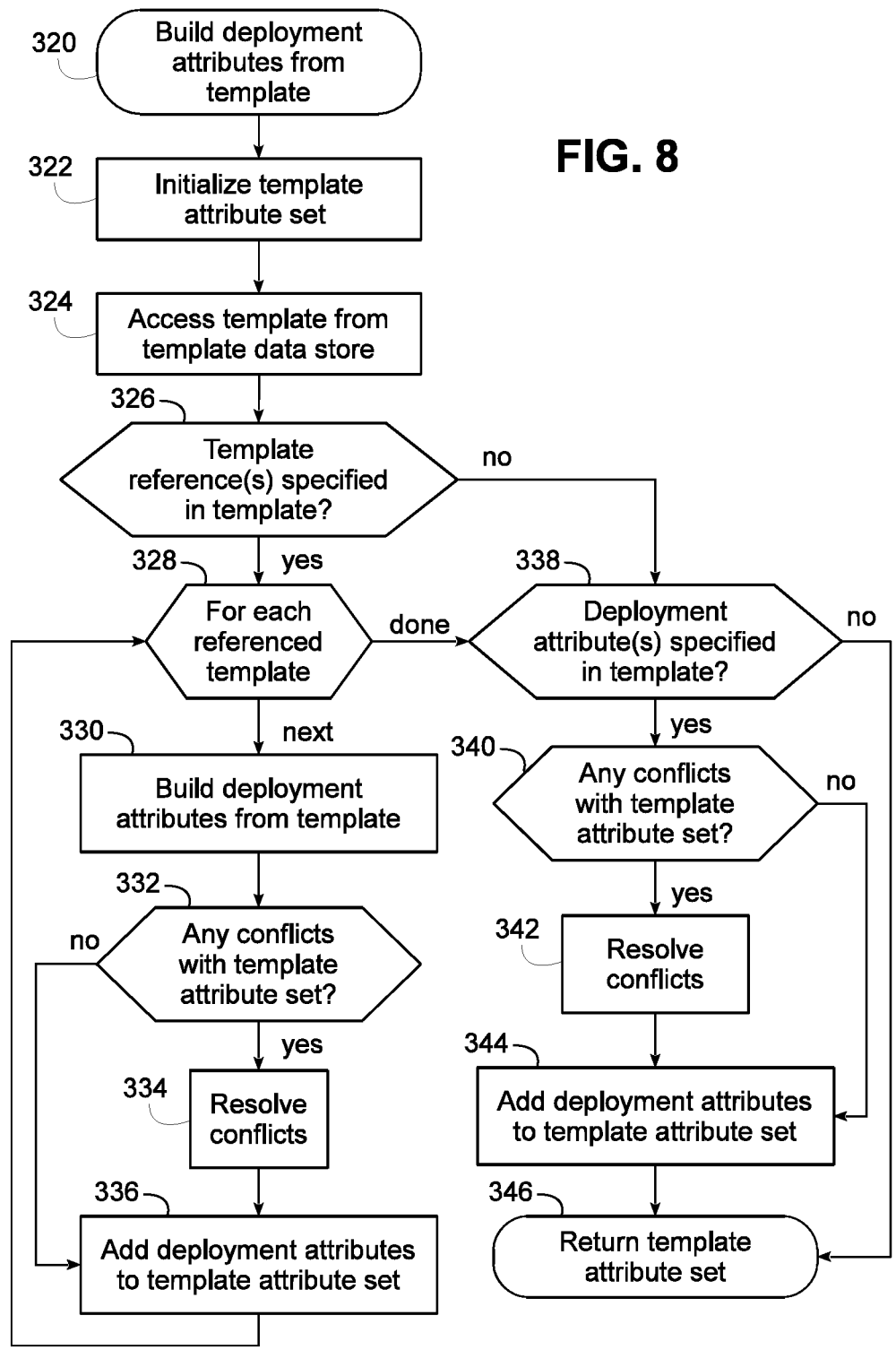
FIG. 8 is a flowchart illustrating an example sequence of operations for building deployment attributes from a template in the virtualized computing environment of FIGS. 3A-3B.

FIG. 8 next illustrates an example sequence of operations 320 for building deployment attributes from a virtual machine template, e.g., as may be performed in block 310 of FIG. 7. In this implementation, sequence of operations 320 may be performed recursively so as to support multiple levels of composite virtual machine templates referencing other composite virtual machine templates, although in other embodiments, multi-level references may not be supported.

In the illustrated embodiment, a specific virtual machine template may be specified upon initiation of sequence of operations 320, and the sequence may return a template attribute set representing the set of deployment attributes specified by the specified virtual machine template, whether directly within the template itself or indirectly within another virtual machine template referenced by the specified virtual machine template. First, in block 322, the template attribute set is initialized, e.g., to a null set. Next, in block 324, the virtual machine template is accessed from a template data store, and block 326 determines whether any template references are specified in the accessed virtual machine template (e.g., within a template reference element of the virtual machine template). If so, block 326 passes control to block 328 to initiate a FOR loop to process each other virtual machine template referenced by the virtual machine template.

For each such referenced virtual machine template, block 330 makes a recursive call to sequence of operations 320, specifying the referenced virtual machine template, resulting in the return of a template attribute set for the referenced virtual machine template. Block 332 then determines whether any of the deployment attributes returned from the recursive call raise any conflicts with any deployment attributes already in the template attribute set, similar to the conflicts discussed above in connection with FIG. 7. If any conflicts exist, control passes to block 334 to resolve any conflicts, and then to block 336 to add the deployment attributes for the referenced virtual machine template to the template attribute set. As with conflicts between deployments specified within and outside of virtual machine templates, conflicts between deployment attributes specified in different templates may be resolved in any number of manners. In one embodiment, for example, any virtual machine template that references another virtual machine template may be considered to override any deployment attributes specified in the referenced virtual machine template. In another embodiment, an opposite approach may be taken.

If no conflicts are detected, block 332 bypasses block 334 and passes control directly to block 336 to add the deployment attributes returned for the referenced virtual machine template to the template attribute set. Upon completion of block 336, control returns to block 328 to process additional referenced virtual machine templates (if any), and once all such virtual machine templates are processed, block 328 passes control to block 338 to determine whether any deployment attributes are specified in the virtual machine template specified for this call of the sequence of operations 320 (e.g., within the template attribute element of the template), and if so, control passes to block 340 to determine whether any of the deployment attributes specified in this template raise any conflicts with any deployment attributes already in the template attribute set, similar to block 332. If any conflicts exist, control passes to block 342 to resolve any conflicts (e.g., in a similar manner to block 334), and then to block 344 to add the deployment attributes specified in the virtual machine template to the template attribute set, and then to block 346 to return the template attribute set to the calling sequence of operations. If no conflicts are detected, block 340 bypasses block 342 and passes control directly to block 344. In addition, if no deployment attributes are specified in this template, block 338 passes control directly to block 346. As such, the deployment attributes specified by multiple levels of referenced virtual machine templates may effectively be combined in a recursive manner to return an overall set of deployment attributes for use in a virtual machine deployment operation.

Figure 9:
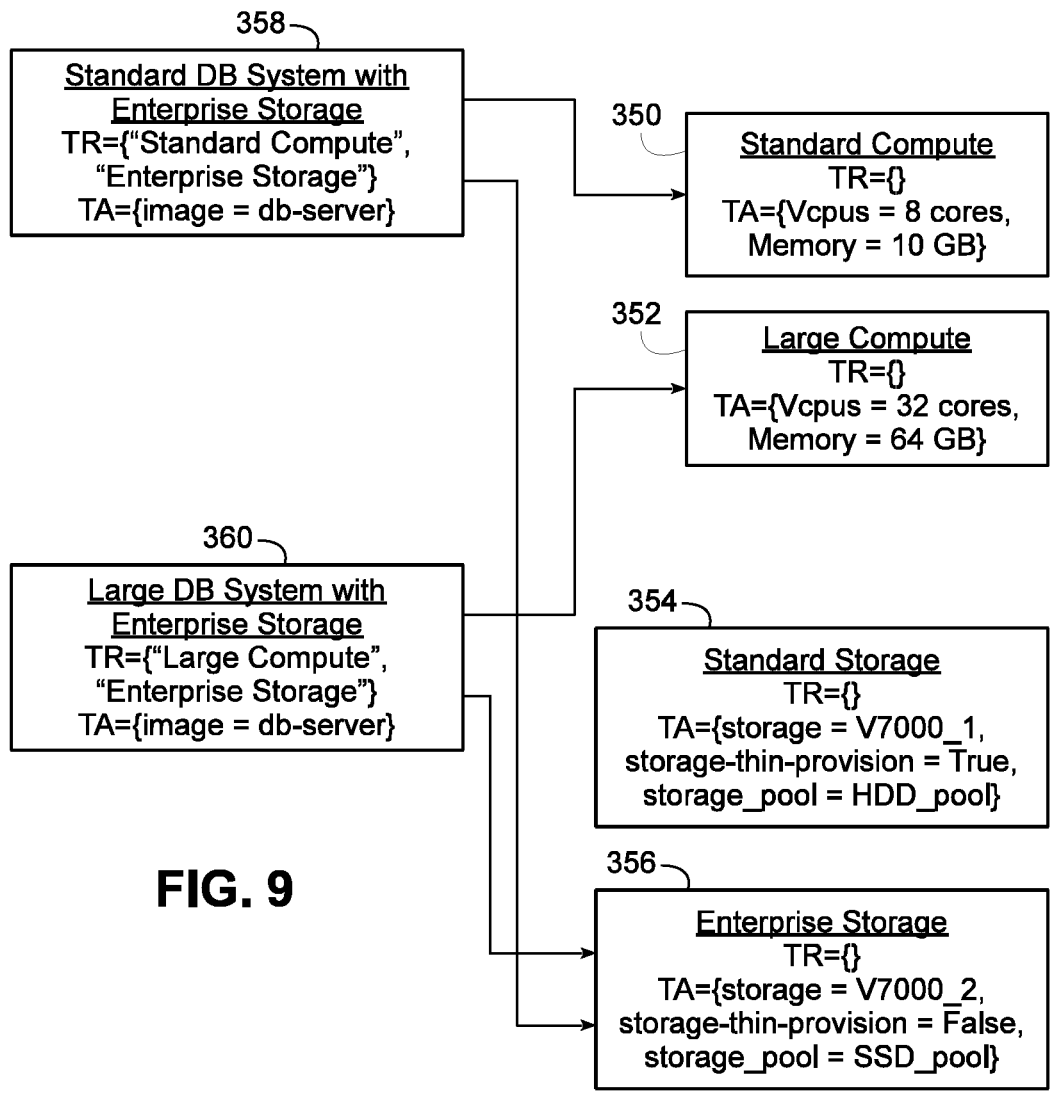
FIG. 9 is a block diagram of example virtual machine templates created in the virtualized computing environment of FIGS. 3A-3B.

Now with reference to FIG. 9, a representative example of how composite virtual machine templates may be configured in some embodiments is provided. For the purposes of this example, assume that both non-composite and composite virtual machine templates are supported. For a non-composite virtual machine template (VM-Template), let:

VM-Template.Name:=user-defined name that identifies the template; and

VM-Template.TA:={set of key-value pairs to use in a VM deployment};

where TA refers to a template attribute element.

Likewise, for a composite virtual machine template (VM-Composite-Template), let:

VM-Composite-Template.Name:=user-defined name that identifies the template;

VM-Composite-Template.TR:={set of template names referenced by this composite template}; and VM-Composite-Template.TA:={set of key-value pairs to use in VM deployment (in addition to those specified from referenced templates)};

where TR refers to a template reference element.

In this example, assume that a composite virtual machine template may reference non-composite and/or composite virtual machine templates, and that when a user wishes to deploy a virtual machine, the user may only need to specify a name for the virtual machine and a single virtual machine template to be used in the deployment. Also assume that a set of virtual machine templates, e.g., templates 350, 352, may be configured as compute templates that define differing sets of compute-related attributes, and that another set of virtual machine templates, e.g., templates 354, 356, may be configured as storage templates that define differing sets of storage-related attributes. In some embodiments, similar sets of virtual machine templates may be defined for other aspects of a deployment, e.g., network templates for network-related attributes.

For the compute templates 350, 352, compute template 350 may be configured for a deployment of a virtual machine with "standard" compute resource allocation, and as such, may include a descriptive template identifier or name such as "Standard Compute" and a set of compute-related deployment attributes such as a virtual CPU requirement of 8 cores and a virtual memory requirement of 10 GB. Compute template 352, on the other hand, may be configured for a deployment of a virtual machine with a larger compute resource allocation, and as such, may include a descriptive template identifier or name such as "Large Compute" and a set of compute-related deployment attributes such as a virtual CPU requirement of 32 cores and a virtual memory requirement of 64 GB. In addition, both compute templates 350, 352 are illustrated as having no references to other virtual machine templates, so the template reference elements for those templates include empty sets.

Similarly, for the storage templates 354, 356, storage template 354 may be configured for a deployment of a virtual machine with "standard" storage resource allocation, and as such, may include a descriptive template identifier or name such as "Standard Storage" and a set of storage-related deployment attributes such as a storage volume identifier of "V7000_1", a storage-thin-provision flag set to true to indicate thin provisioning should be used, and a storage_pool identifier set of "HDD_pool" to indicate that hard disk drives should be used. Storage template 356, on the other hand, may be configured for a deployment of a virtual machine with "enterprise" storage resource allocation, and as such, may include a descriptive template identifier or name such as "Enterprise Storage" and a set of storage-related deployment attributes such as a storage volume identifier of "V7000_2", a storage-thin-provision flag set to false to indicate thick provisioning should be used, and a storage_pool identifier set of "SSD_pool" to indicate that solid state drives should be used. In addition, both storage templates 354, 356 are illustrated as having no references to other virtual machine templates, so the template reference elements for those templates include empty sets.

Based upon these virtual machine templates, two example composite virtual machine templates 358, 360 are illustrated, with composite virtual machine template 358 having a template identifier or name such as "Standard DB System with Enterprise Storage," with template references to the "Standard Compute" compute template 350 and "Enterprise Storage" storage template 356, and with additional deployment attributes including an image attribute that identifies the disk image to use in the deployment as "db-server." Composite virtual machine template 360, in contrast, has a template identifier or name such as "Large DB System with Enterprise Storage," with a similar template reference to "Enterprise Storage" storage template 356, and a similar image attribute that identifies the disk image to use in the deployment as "db-server," but with a different compute template, "Large Compute" compute template 352, referenced instead of compute template 350. As such, the two composite virtual machine templates 358, 360 share common images and storage-related deployment attributes, but differ in terms of the compute-related deployment attributes. Moreover, it will be appreciated that any changes to storage template 356 will effectively be propagated to both of composite virtual machine templates 358, 360. Thus, for example, if after one virtual machine is deployed using composite virtual machine template 360, storage template 356 is modified to include a different set of deployment attributes, a second virtual machine that is thereafter deployed using template 360 will use the different set of deployment attributes specified by the modified template 356.

Figure 10:
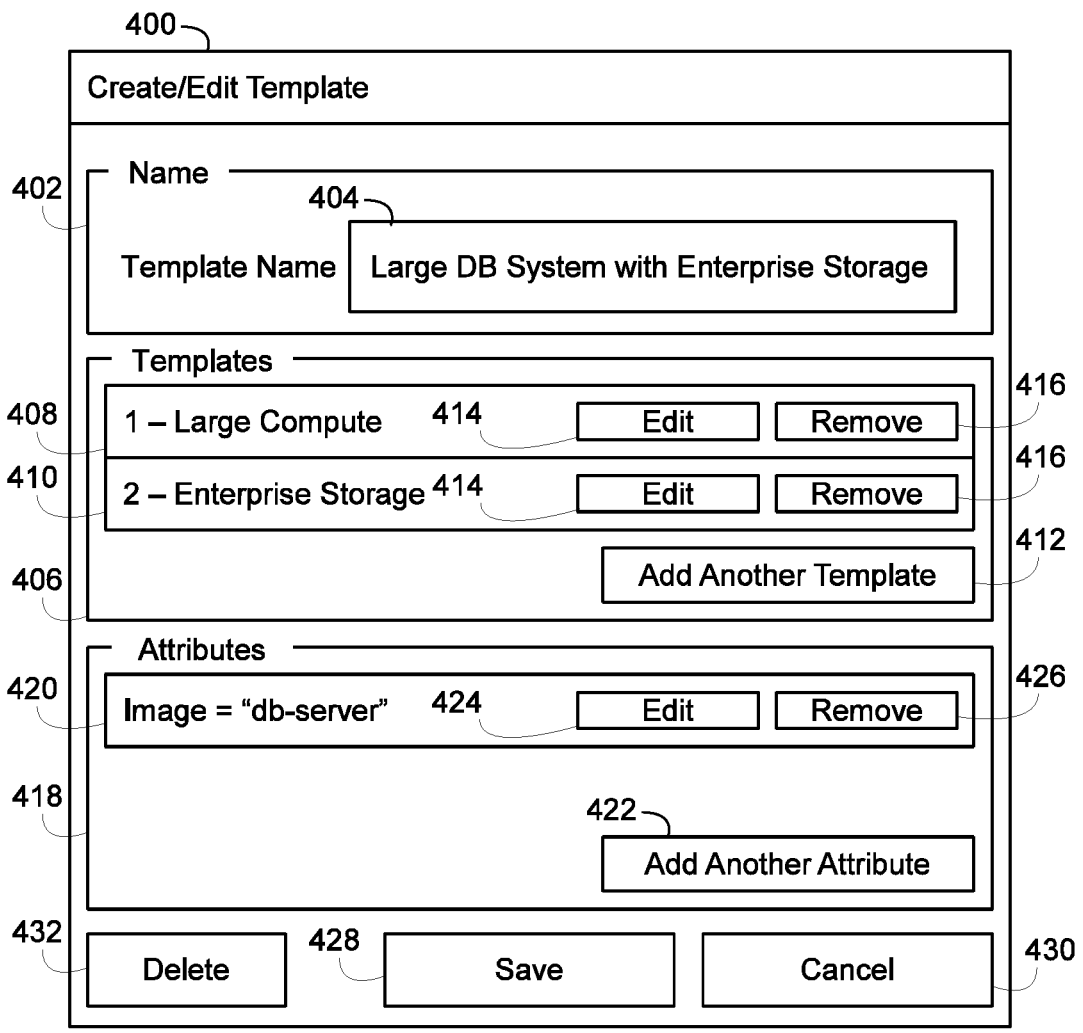
FIG. 10 is a block diagram for an example user interface for managing a composite virtual machine template in the virtualized computing environment of FIGS. 3A-3B.

Returning briefly to FIG. 4, it will be appreciated that framework 200 may also support management of a template data store to perform functions such as adding new composite and/or non-composite virtual machine templates, as well as modifying or deleting templates stored in the template data store. Such management may be performed in a number of manners, e.g., using user and/or programmatic interfaces. FIG. 10, for example, illustrates an example user interface 400 that may be presented to an administrator in order to create or edit a virtual machine template used in the deployment of a virtual machine, e.g., composite virtual machine template 360 of FIG. 9. Interface 400 may include, for example, a first panel 402 including a text box 404 within which an administrator may add or modify the template identifier element for the template (e.g., "Large DB System with Enterprise Storage").

A second panel 406 may be used to configure the template reference element for the template, and thereby configure which other virtual machine templates are referenced by the composite virtual machine template, e.g., as represented by entries 408, 410 corresponding respectively to compute template 352 and storage template 356 of FIG. 9. Additional templates may be added using a button 412, while each entry 408, 410 may be provided with edit and remove buttons 414, 416. An edit button 414 may be used, for example, to open another window to view, edit or otherwise configure the associated virtual machine template for the entry, while a remove button 416 may be used to remove the reference to the associated virtual machine template corresponding to the entry.

A third panel 418 may be used to configure the template attribute element for the template, and thereby configure the additional deployment attributes to be associated with the template, e.g., as represented by entry 420 corresponding to the image attribute in template 360 of FIG. 9. Additional attributes may be added using a button 422, while each entry 420 may be provided with edit and remove buttons 424, 426. An edit button 424 may be used, for example, to open another window to view, edit or otherwise configure the associated deployment attribute for the entry, while a remove button 426 may be used to remove the deployment attribute corresponding to the entry.

User interface 400 may also include save and cancel buttons 428 and 430 to either save the virtual machine template or cancel the creation/edits for the virtual machine template. In addition, a delete button 432 may be used to delete the virtual machine template and remove it from the template data store. It will be appreciated that other interfaces may be used to configure and manage composite virtual machine templates in other embodiments. Therefore, the invention is not limited to the particular interfaces disclosed herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of deploying a virtual machine in a virtualized computing environment, the method comprising:
   accessing a composite virtual machine template from a virtual machine template data store to retrieve a plurality of deployment attributes for use in deploying a virtual machine;
      wherein the composite virtual machine template includes first and second respective references to first and second virtual machine templates;
      wherein the first virtual machine template defines a first set of deployment attributes and the second virtual machine template defines a second set of deployment attributes;
      wherein the plurality of deployment attributes includes the first and second sets of deployment attributes;
      wherein retrieving the plurality of deployment attributes includes accessing the first and second virtual machine templates using the first and second references to retrieve the first and second sets of deployment attributes from the virtual machine template data store;
      wherein the composite, first and second virtual machine templates each include a plurality of data elements;
      wherein the plurality of data elements for each of the composite, first and second virtual machine templates includes a template identifier element storing an identifier for the respective composite, first and second virtual machine template;
      wherein the plurality of data elements for the first virtual machine template includes a template attribute element storing the first set of deployment attributes, wherein the plurality of data elements for the second virtual machine template includes a template attribute element storing the second set of deployment attributes, and wherein the plurality of data elements for the composite virtual machine template includes a template attribute element storing a third set of deployment attributes among the plurality of deployment attributes; and
      wherein the template attribute element for the first virtual machine template includes a first set of key-value pairs defining the first set of deployment attributes, and wherein the template attribute element for the second virtual machine template includes a second set of key-value pairs defining the second set of deployment attributes; and
   initiating a deployment of a virtual machine in the virtualized computing environment according to the plurality of deployment attributes.

2. The method of claim 1, wherein the composite virtual machine template further includes a third set of deployment attributes, wherein the plurality of attributes includes the third set of deployment attributes, and wherein retrieving the plurality of deployment attributes further includes accessing the composite virtual machine template to retrieve the third set of deployment attributes from the virtual machine template data store.

3. The method of claim 1, wherein the first virtual machine template includes a third reference to a third virtual machine template, the third virtual machine template defining a third set of deployment attributes, wherein the plurality of attributes includes the third set of deployment attributes, and wherein retrieving the plurality of deployment attributes includes accessing the third virtual machine template using the third reference to retrieve the third set of deployment attributes from the virtual machine template data store.

4. The method of claim 1, wherein the plurality of deployment attributes include a deployment image attribute, a virtual processor attribute, a virtual memory attribute, a virtual network attribute, a virtual storage attribute and/or a high availability attribute.

5. The method of claim 1, wherein the first reference includes the identifier for the first virtual machine template, wherein the second reference includes the identifier for the second virtual machine template, wherein the plurality of data elements for the composite virtual machine template includes a template reference element, the template reference element storing a set of template references including the first and second references, and wherein the template reference element for the composite virtual machine template includes a third set of key-value pairs defining the set of template references.

6. The method of claim 1, wherein the composite virtual machine template includes a third reference to a third virtual machine template, wherein the first virtual machine template is among a plurality of compute templates defining differing sets of compute attributes, wherein the second virtual machine template is among a plurality of storage templates defining differing sets of storage attributes, and wherein the third virtual machine template is among a plurality of network templates defining differing sets of network attributes.

7. The method of claim 1, wherein accessing the composite virtual machine template and initiating the deployment of the virtual machine are performed in response to a request to deploy a virtual machine using the composite virtual machine template.

8. The method of claim 1, further comprising adding a second composite virtual machine template to the data store in response to user input.

9. The method of claim 1, further comprising deleting the composite virtual machine template from the data store in response to user input.

10. The method of claim 1, further comprising modifying the composite virtual machine template in the data store in response to user input.

11. The method of claim 1, wherein modifying the composite virtual machine template in the data store includes modifying the first reference to reference a third virtual machine template stored in the data store and defining third first set of deployment attributes.

12. The method of claim 1, further comprising, after initiating the deployment of the virtual machine:
modifying the first virtual machine template in the data store in response to user input to modify the first set of deployment attributes; and
initiating a deployment of a second virtual machine using the composite virtual machine template such that the deployment of the second virtual machine is according to a second plurality of deployment attributes that includes the modified first set of deployment attributes.

13. An apparatus, comprising:
at least one processor; and
program code configured upon execution by the at least one processor deploy a virtual machine in a virtualized computing environment, the program code configured to:
access a composite virtual machine template from a virtual machine template data store to retrieve a plurality of deployment attributes for use in deploying a virtual machine;
wherein the composite virtual machine template includes first and second respective references to first and second virtual machine templates;
wherein the first virtual machine template defines a first set of deployment attributes and the second virtual machine template defines a second set of deployment attributes;
wherein the plurality of deployment attributes includes the first and second sets of deployment attributes;
wherein retrieving the plurality of deployment attributes includes accessing the first and second virtual machine templates using the first and second references to retrieve the first and second sets of deployment attributes from the virtual machine template data store;
wherein the composite, first and second virtual machine templates each include a plurality of data elements;
wherein the plurality of data elements for each of the composite, first and second virtual machine templates includes a template identifier element storing an identifier for the respective composite, first and second virtual machine template;
wherein the plurality of data elements for the first virtual machine template includes a template attribute element storing the first set of deployment attributes, wherein the plurality of data elements for the second virtual machine template includes a template attribute element storing the second set of deployment attributes, and wherein the plurality of data elements for the composite virtual machine template includes a template attribute element storing a third set of deployment attributes among the plurality of deployment attributes; and
wherein the template attribute element for the first virtual machine template includes a first set of key-value pairs defining the first set of deployment attributes, and wherein the template attribute element for the second virtual machine template includes a second set of key-value pairs defining the second set of deployment attributes; and
initiate a deployment of a virtual machine in the virtualized computing environment according to the plurality of deployment attributes.

14. A program product, comprising:
a non-transitory computer readable medium; and
program code stored on the non-transitory computer readable medium and configured upon execution by at least one processor to deploy a virtual machine in a virtualized computing environment by:
accessing a composite virtual machine template from a virtual machine template data store to retrieve a plurality of deployment attributes for use in deploying a virtual machine;

wherein the composite virtual machine template includes first and second respective references to first and second virtual machine templates;

wherein the first virtual machine template defines a first set of deployment attributes and the second virtual machine template defines a second set of deployment attributes;

wherein the plurality of deployment attributes includes the first and second sets of deployment attributes;

wherein retrieving the plurality of deployment attributes includes accessing the first and second virtual machine templates using the first and second references to retrieve the first and second sets of deployment attributes from the virtual machine template data store;

wherein the composite, first and second virtual machine templates each include a plurality of data elements;

wherein the plurality of data elements for each of the composite, first and second virtual machine templates includes a template identifier element storing an identifier for the respective composite, first and second virtual machine template;

wherein the plurality of data elements for the first virtual machine template includes a template attribute element storing the first set of deployment attributes, wherein the plurality of data elements for the second virtual machine template includes a template attribute element storing the second set of deployment attributes, and wherein the plurality of data elements for the composite virtual machine template includes a template attribute element storing a third set of deployment attributes among the plurality of deployment attributes; and wherein the template attribute element for the first virtual machine template includes a first set of key-value pairs defining the first set of deployment attributes, and wherein the template attribute element for the second virtual machine template includes a second set of key-value pairs defining the second set of deployment attributes; and initiating a deployment of a virtual machine in the virtualized computing environment according to the plurality of deployment attributes.

* * * * *